United States Patent
Kawase et al.

(10) Patent No.: US 11,443,875 B2
(45) Date of Patent: Sep. 13, 2022

(54) WIRE HARNESS MANUFACTURING SYSTEM

(71) Applicant: Hitachi Metals, Ltd., Tokyo (JP)

(72) Inventors: Kenji Kawase, Hitachi (JP); Masaru Ishikawa, Hitachi (JP); Hideki Saito, Hitachi (JP); Hajime Maejo, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 342 days.

(21) Appl. No.: 16/727,462

(22) Filed: Dec. 26, 2019

(65) Prior Publication Data
US 2020/0168368 A1 May 28, 2020

Related U.S. Application Data

(63) Continuation of application No. 15/699,506, filed on Sep. 8, 2017, now Pat. No. 10,679,776.

(30) Foreign Application Priority Data

Sep. 29, 2016 (JP) .................................. 2016-191215

(51) Int. Cl.
*H01B 13/012* (2006.01)
*H01R 43/28* (2006.01)
(Continued)

(52) U.S. Cl.
CPC ..... *H01B 13/01227* (2013.01); *B23D 33/006* (2013.01); *B65H 51/18* (2013.01);
(Continued)

(58) Field of Classification Search
CPC ........ H01B 13/01227; H01B 13/01245; H01R 43/38; Y10T 29/53243
See application file for complete search history.

(56) References Cited

U.S. PATENT DOCUMENTS 4,261,231 A 4/1981 Bleakley
5,526,562 A * 6/1996 Kita .................... B60R 16/0207
198/486.1
(Continued)

FOREIGN PATENT DOCUMENTS

DE 202014105783 U1 2/2015
GB 2283835 A 5/1995
(Continued)

OTHER PUBLICATIONS

Partial European Search Report issued in corresponding EP Application No. 19199440.9 dated Jan. 20, 2020.
(Continued)

*Primary Examiner* — Livius R. Cazan
(74) *Attorney, Agent, or Firm* — Roberts Calderon Safran & Cole P.C.

(57) ABSTRACT

A wire harness manufacturing system includes a display unit, a wire cutting machine that draws an electric wire from a wire feed reel and cuts the electric wire to a predetermined length, a control unit that directs the display unit to display a wire laying image and wire work identification information for identifying a work regarding each electric wire, the wire laying image including a plurality of wire images showing the plurality of electric wire in the laid state and the wire work identification information being displayed in the vicinity of the corresponding wire image, and a memory unit that stores the wire laying image and work instruction information so as to correspond to the wire work identification information, the work instruction information including cut length of the electric wire. The control unit sends the cut length information to the wire cutting machine.

9 Claims, 11 Drawing Sheets

(51) Int. Cl.
  *G05B 19/18* (2006.01)
  *B23D 33/00* (2006.01)
  *B65H 51/18* (2006.01)

(52) U.S. Cl.
  CPC ..... *G05B 19/182* (2013.01); *H01B 13/01236* (2013.01); *B65H 2701/341* (2013.01); *G05B 2219/45042* (2013.01); *H01R 43/28* (2013.01); *H01R 2201/04* (2013.01); *Y10T 29/53243* (2015.01)

(56) References Cited

U.S. PATENT DOCUMENTS

| | | | |
|---|---|---|---|
| 5,594,980 | A | 1/1997 | Tamura et al. |
| 8,442,664 | B1 * | 5/2013 | Guglielmo ............. H01R 43/28 29/33 M |
| 9,257,808 | B1 | 2/2016 | Guglielmo |
| 2009/0265923 | A1 * | 10/2009 | MaClean ......... H01B 13/01227 29/729 |
| 2016/0064121 | A1 | 3/2016 | Rougier et al. |

FOREIGN PATENT DOCUMENTS

| | | |
|---|---|---|
| JP | 2001076558 A | 3/2001 |
| JP | 2010277904 A | 12/2010 |

OTHER PUBLICATIONS

Extended European Search Report issued in corresponding EP Application No. 19199440.9 dated Jun. 18, 2020.
Extended European Search Report issued in the corresponding EP application No. 17190508.6 dated Feb. 23, 2018.
Japanese Office Action issued in corresponding Japanese Application No. 2018-218843 dated Dec. 7, 2018.
Office Action issued in corresponding Chinese Application No. 201710818016.7 dated Jun. 5, 2019.
Extended European Search Report issued in corresponding EP Application No. 19176245.9 dated Sep. 18, 2019.

* cited by examiner

FIG.3

| POP-UP BARCODE | WIRE No. | WIRE TYPE | WIRE TYPE BARCODE | CUT LENGTH | A-END CODE | A-END BARCODE | B-END CODE | B-END BARCODE |
|---|---|---|---|---|---|---|---|---|
| ‖‖‖ | U10-01-1 | ······ISQ | ‖‖‖ | 1400 | E100[167] | ‖‖‖ | E100[180] | ‖‖‖ |
| ‖‖‖ | U10-01-2 | ······ISQ | ‖‖‖ | 1400 | E100[168] | ‖‖‖ | E100[181] | ‖‖‖ |
| ‖‖‖ | U10-01-3 | ······0.75 | ‖‖‖ | 1100 | E100[169] | ‖‖‖ | E100[182] | ‖‖‖ |

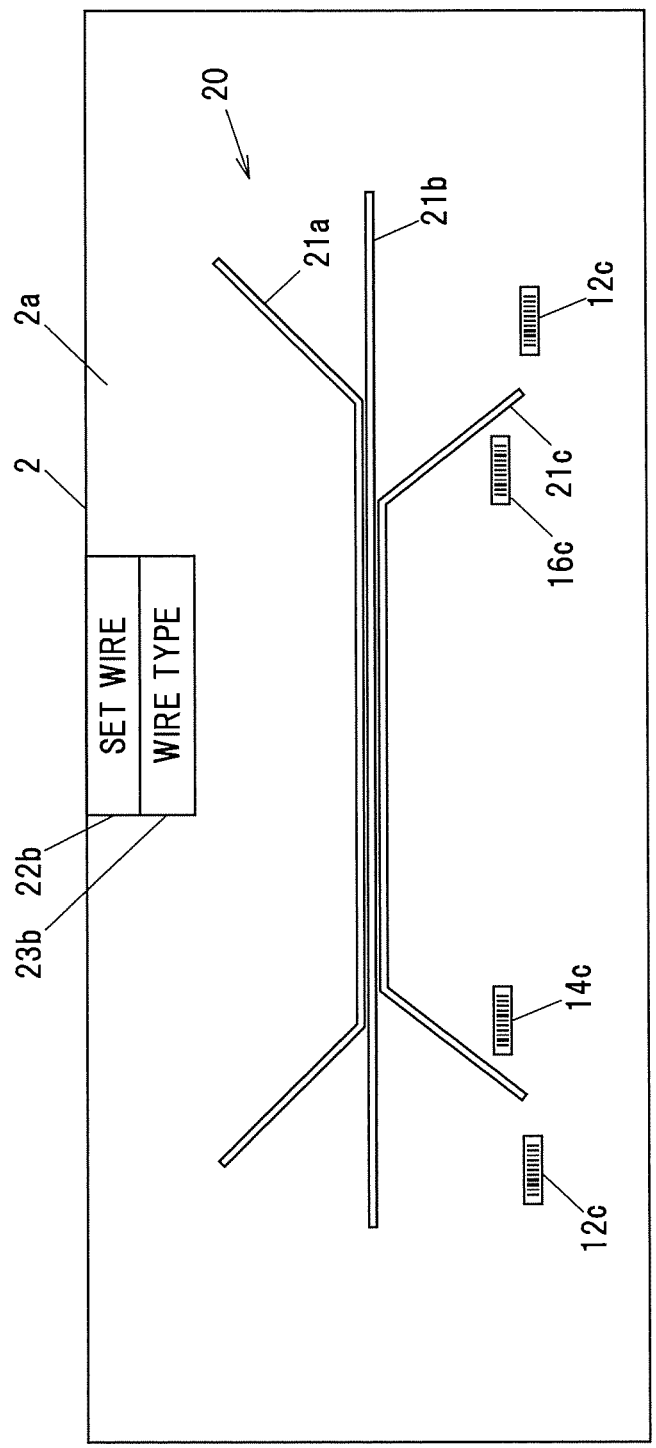

WIRE HARNESS MANUFACTURING SYSTEM

BACKGROUND OF THE INVENTION

1. Field of the Invention

The invention relates to a wire harness manufacturing system.

2. Description of the Related Art

In general, a wire laying board is used for assembling a wire harness. The wire laying board is formed by sticking a full-size drawing of a wire harness onto an assembly drawing board and a wire laying jig is attached to the wire laying board. On the full-size drawing, operating instructions such as assembly procedure and accessory component attachment instructions are also given. A worker lays an electric wire in accordance with the operating instructions and attaches accessory components to predetermined positions on the wire or a bundle of wires which is laid on the board, thereby assembling a wire harness.

However, the full-size drawing had to be replaced every time the wire harness is subjected to design change. In this light, a wire harness manufacturing system has been proposed which removes the replacements work (see e.g. US-A1-2016/0064121).

The wire harness manufacturing system is provided with a display unit and a control unit which orders the display unit to display images of plural electric wires constituting a wire harness, wire-end numbers and wire-end codes representing end processing of the electric wire.

SUMMARY OF THE INVENTION

The prior wire harness manufacturing system needs a space for storing wires that are pre-cut to a predetermined length.

It is an object of the invention to provide a wire harness manufacturing system that can remove the space for storing the cut wires.

According to an embodiment of the invention, a wire harness manufacturing system comprises:

a display unit;

a wire cutting machine that draws an electric wire from a wire feed reel and cuts the electric wire to a predetermined length;

a control unit that directs the display unit to display a wire laying image and wire work identification information for identifying a work regarding each electric wire, the wire laying image including a plurality of wire images showing the plurality of electric wire in the laid state and the wire work identification information being displayed in the vicinity of the corresponding wire image; and a memory unit that stores the wire laying image and work instruction information so as to correspond to the wire work identification information, the work instruction information including cut length of the electric wire, wherein the control unit acquires the cut length information corresponding to the wire work identification information from the memory unit when receiving a signal instructing to read the wire work identification information, and sends the cut length information to the wire cutting machine so that the wire cutting machine cuts the electric wire to a length corresponding to the cut length.

Effects of the Invention

According to an embodiment of the invention, a wire harness manufacturing system can be provided that can remove the space for storing the cut wires.

BRIEF DESCRIPTION OF THE DRAWINGS

Next, the present invention will be explained in more detail in conjunction with appended drawings, wherein:

FIG. 3 is a diagram illustrating an example of work instruction information stored in a memory unit of the system controller;

FIG. 5D is a diagram illustrating a display example of the display unit;

DETAILED DESCRIPTION OF THE PREFERRED EMBODIMENTS

Figure 1:
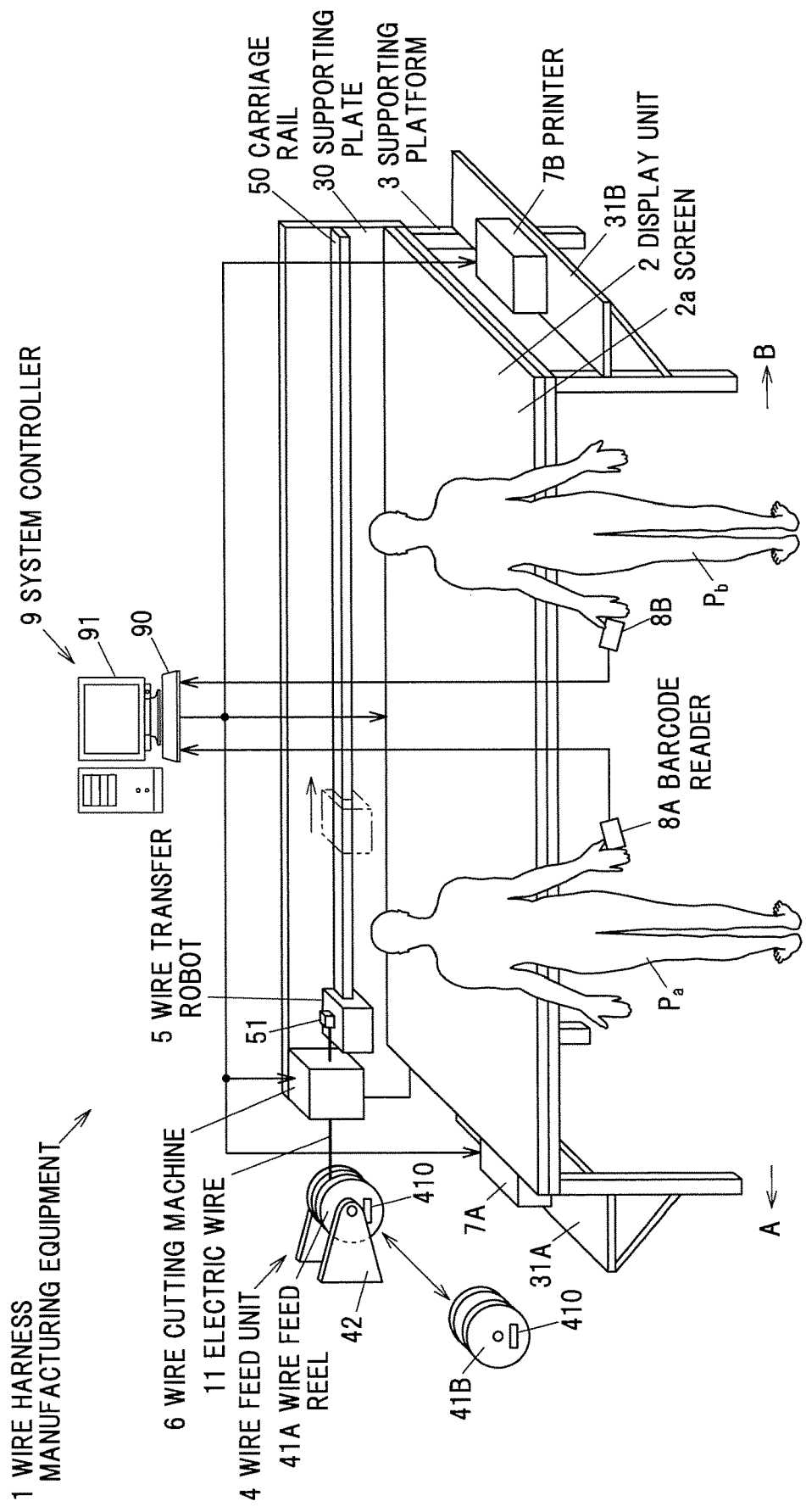
FIG. 1 is a schematic perspective view showing an example configuration of a wire harness manufacturing system in an embodiment of the present invention.

An embodiment of the invention will be described below in reference to the drawings. Note that, constituent elements having substantially the same functions are denoted by the same reference numerals in each drawing and the overlapping explanation thereof will be omitted.

FIG. 1 is a schematic perspective view showing an example configuration of a wire harness manufacturing system in an embodiment of the invention.

A wire harness manufacturing system 1 is provided with a rectangular display unit 2, a supporting platform 3 supporting the display unit 2, a wire feed unit 4 arranged on a side A (one side of the display unit 2 in the longitudinal direction) to feed an electric wire 11 constituting a wire harness, a wire transfer robot 5 provided in the vicinity of the display unit 2 along the longitudinal direction of the display unit 2 to convey the electric wire 11 fed from the wire feed unit 4, a wire cutting machine 6 arranged on the side A (the one side of the display unit 2 in the longitudinal direction) to cut the electric wire 11 conveyed by the wire transfer robot 5, printers 7A and 7B arranged respectively on sides A and B (both sides of the display unit 2 in the longitudinal direction) to print codes, etc., on marker tubes, etc., to be attached to the electric wire 11, barcode readers 8A and 8B for scanning barcodes, and a system controller 9 which controls each unit of the equipment 1. The wire transfer robot 5 is an example of a travel unit which travels a distance corresponding to cut length of electric wire in accordance with an instruction from a wire cutting machine or a control unit.

"Wire harness" here means a product formed by bundling plural electric wires 11, and may include those having connectors or terminals for connection to printed-circuit board or device at both ends of each electric wire 11. End processing means a process of connecting a connector or terminal to an end of the electric wire 11.

For the display unit 2, it is possible to use a flat panel display, e.g., a color liquid crystal display, an organic EL display or a plasma display, etc. Alternatively, a touch panel display which is a combination of a touch panel and a display may be uses as the display unit 2.

The display unit 2 may consist of one display as shown in FIG. 1, but may be compose of plural displays arranged along the longitudinal direction of the wire harness depending on the full-length of the wire harness. When using plural displays, the number of displays to be used can be determined according to the full-length of the wire harness and this allows various wire harnesses with different full-lengths to be manufactured easily. When providing a screen 2a of, e.g., 68 cm in width and 15 m in length, fifteen displays of 68 cm in width and 1 m in length are arranged in the longitudinal direction. When using plural displays as such, an image to be displayed on the display unit 2 is divided and allocated to each display.

The supporting platform 3 supports the display unit 2 from underneath so that the screen 2a is substantially level. It is preferable to use the supporting platform 3 having such a height that workers Pa and Pb can easily carry out tasks on the screen 2a of the display unit 2. Meanwhile, the supporting platform 3 is provided with a supporting plate 30 which supports a carriage rail 50 and the wire cutting machine 6, and side shelf boards 31A and 31B on which the printers 7A and 7B are respectively arranged. In the present embodiment, two workers Pa and Pb work near the display unit 2. The worker Pa operates on the left side of the display unit 2 in the longitudinal direction, and the worker Pb operates on the right side of the display unit 2 in the longitudinal direction. However, one worker may be in charge of the entire operation.

Configuration of the Wire Feed Unit

The wire feed unit 4 is arranged on the side A (the one side of the display unit 2 in the longitudinal direction), and is provided with wire feed reels 41A and 41B for feeding the electric wire 11 to the wire transfer robot 5 via the wire cutting machine 6, and a support member 42 which is fixed to a frame (not shown) to rotatably support the wire feed reel 41A or 41B.

When the wire transfer robot 5 travels along the carriage rail 50 in a state that a gripping portion 51 (described later) of the wire transfer robot 5 is gripping the electric wire 11, the wire feed reel 41A or 41B rotates and the electric wire 11 is fed onto the carriage rail 50. The wire feed reels 41A and 41B may have a built-in motor which assists a drive force of the wire transfer robot 5. In this case, it is possible to reduce the size of the wire transfer robot 5. The wire feed unit 4 is configured that the wire feed reels 41A and 41B can be changed over according to the required type of electric wire. Labels 410 are stuck to the wire feed reels 41A and 41B. Wire types 23a and 23b and wire type barcodes 43a and 43b corresponding to the wire types 23a and 23b are printed on the labels 410. The wire types 23a and 23b and the wire type barcodes 43a and 43b are examples of wire identification information for identifying electric wires.

Configuration of the Wire Transfer Robot

The wire transfer robot 5 travels on the carriage rail 50 while holding the electric wire 11 fed from the wire feed unit 4, thereby conveying the electric wire 11. The wire transfer robot 5 is provided with a motor (not shown), wheels (not shown) which turn on the supporting platform 3 by activation of a motor and moves at a constant speed, and the gripping portion 51 which grips the electric wire 11. The gripping portion 51 may be configured to hold the electric wire 11 by reducing a diameter a hole or by pinching with a clip or clamp. The wire transfer robot 5 is configure to start to travel by activating the motor when a travel start signal is sent from the wire cutting machine 6, and to stop traveling by deactivating the motor when a travel stop signal is sent from the wire cutting machine 6.

The wire cutting machine 6 cuts the electric wire 11 to a length corresponding to cut length information sent from the system controller 9. The wire cutting machine 6 will be described in detail later.

Based on print information (e.g., a barcode) sent from the system controller 9, the printers 7A and 7B print the information on rolled marker tube and marker tape and subsequently cut the marker tube and the marker tape to a predetermined length so that the printed information is not split. The marker tube has a pipe shape and has an inner diameter slightly larger than an outer diameter of the electric wire 11. The marker tape is attached to the electric wire 11 in such a manner that one end is wound around the electric wire 11 and is adhered to itself.

The barcode readers 8A and 8B scan the barcode by an operation of the works Pa and Pb, and send the scanned barcode, together with a reader ID for identification thereof, to the system controller 9. The worker Pa uses the barcode reader 8A and the worker Pb uses the barcode reader 8B. The reader ID and the barcode are examples of signal instructing to read wire work identification information.

Figure 2:
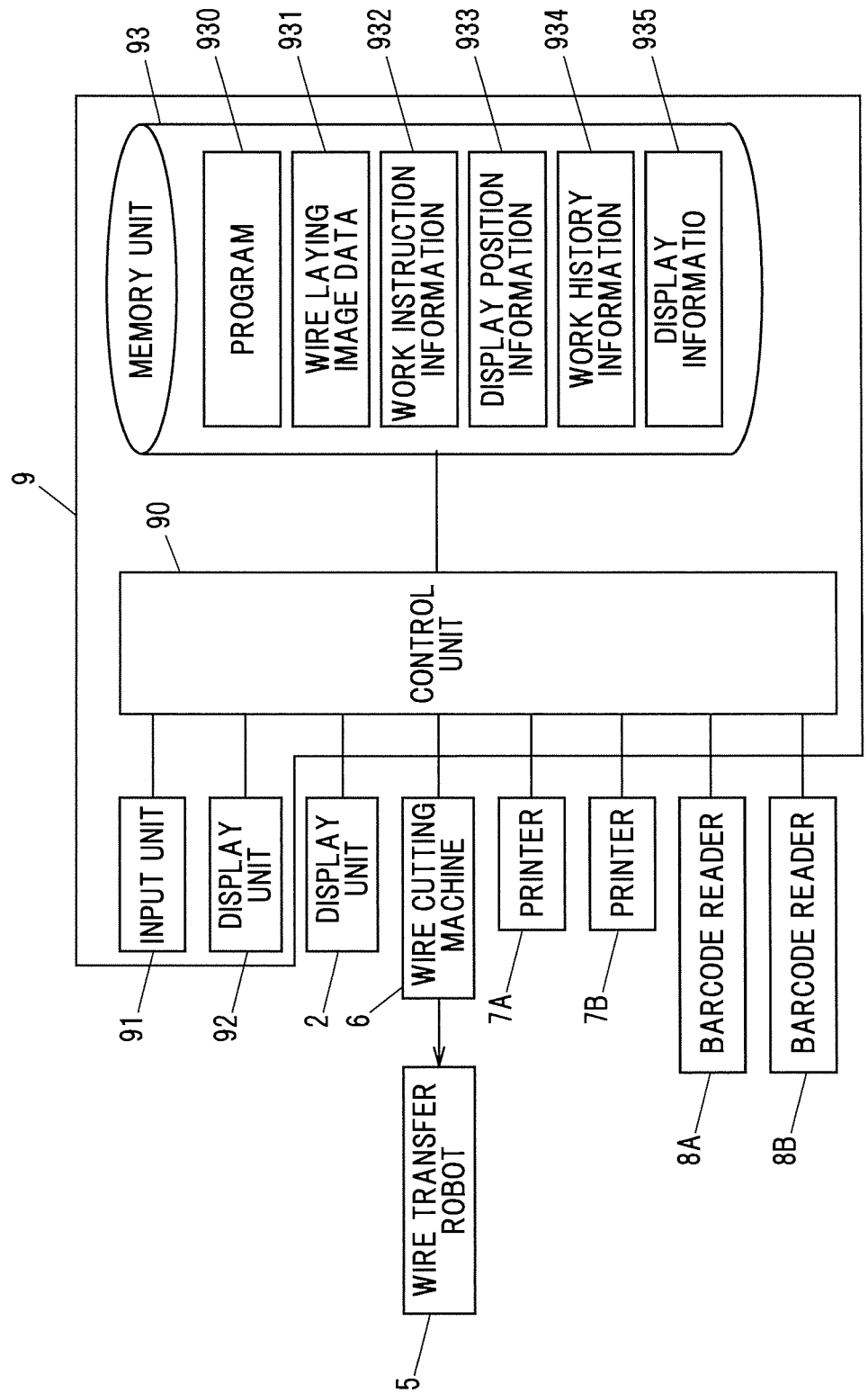
FIG. 2 is a block diagram illustrating an example of a control system of a system controller.

FIG. 2 is a block diagram illustrating a control system of the system controller 9. The system controller 9 has a control unit 90. The control unit 90 is provided with an input unit 91 composed of a keyboard and a mouse, etc., a display unit 92 constructed from a liquid crystal display, etc., and a memory unit 93. The control unit 90 is connected to the display unit 2.

The control unit 90 is constructed using a CPU (Central Processing Unit) or an interface circuit, etc., and controls each unit of the system controller 9 as well as the entire wire harness manufacturing system 1.

The memory unit 93 is constructed using ROM (Read Only Memory), RAM (Random Access Memory) or a hard disc, etc., and stores a program 930, a wire laying image data 931, work instruction information 932, display position information 933, work history information 934 and display information 935, etc. The work instruction information 932 will be described later in reference to FIG. 3.

The wire laying image data 931 is stored in the memory unit 93 so as to correspond to wire harness ID (identification information) used to identify the wire harness. The wire laying image data 931 includes plural wire images each showing a state in which the plural electric wires 11 constituting the wire harness are laid.

The display position information 933 is information indicating display positions (coordinates) on the display unit 2 to display management information such as pop-up barcodes 12a to 12c, A-end barcodes 14a to 14c, B-end barcode 16a to 16c, massages 22a, 22b and wire types 23a and 23b which are described later. The control unit 90 directs the display unit 2 to display the management information at the positions indicated in the display position information 933. The memory unit 93 stores the management information and the wire laying image data 931 separately. Therefore, even when the management information is changed, it is not necessary to modify the wire laying image data 931, hence, saving time and effort. The pop-up barcodes 12a to 12c are examples of wire work identification information for identifying a work regarding each electric wire. The A-end barcodes 14a to 14c and the B-end barcode 16a to 16c are examples of wire-end information indicating end-processing of the electric wire.

The work history information 934 is information of the barcodes scanned by the barcode readers 8A and 8B and the reader IDs which are recorded as work history for each of the pop-up barcodes 12a to 12c or each wire number.

The display information 935 is management information such as the massages 22a and 22b.

The CPU of the control unit 90 operates according to the program 930 and controls each unit of the system controller 9 as well as the entire wire harness manufacturing system 1. The control unit 90 may direct the display unit 2 to also display a jig image indicating an arrangement position of the jig which holds the electric wire 11.

FIG. 3 is a diagram illustrating an example of the work instruction information 932 stored in the memory unit 93. The work instruction information 932 includes a column of "pop-up barcode", a column of "wire No.", a column of "wire type", a column of "wire type barcode", a column of "cut length", a column of "A-end code", a column of "A-end barcode", a column of "B-end code" and a column of "B-end barcode".

In the column of "pop-up barcode", the pop-up barcodes 12a to 12c each identifying a work regarding the corresponding electric wire 11 are sequentially registered from the first row in accordance with the work sequence. In the column of "wire No.", the numbers for specifying the type and cut length of the electric wire are registered. In the column of "wire type", the wire types 23a and 23b are registered. In the column of "wire type barcode", the wire type barcodes 43a and 43b corresponding to the wire types 23a and 23b are registered. In the column of "cut length", the lengths of the electric wires used as a wire harness are registered. In the column of "A-end code", A-end codes 13a, 13b and 13c to be printed on a marker tube to be attached to the left end (on the side A) of the electric wire 11 are registered. In the column of "A-end barcode", the A-end barcodes 14a, 14b and 14c corresponding to the A-end codes 13a, 13b and 13c registered in the column of "A-end code" are registered. In the column of "B-end code", B-end codes 15a, 15b and 15c to be printed on a marker tube to be attached to the right end (the side B) of the electric wire 11 are registered. In the column of "B-end barcode", B-end barcodes 16a, 16b and 16c corresponding to the B-end codes 15a, 15b and 15c registered in the column of "B-end code" are registered.

Configuration of the Wire Cutting Machine

Figure 4A:
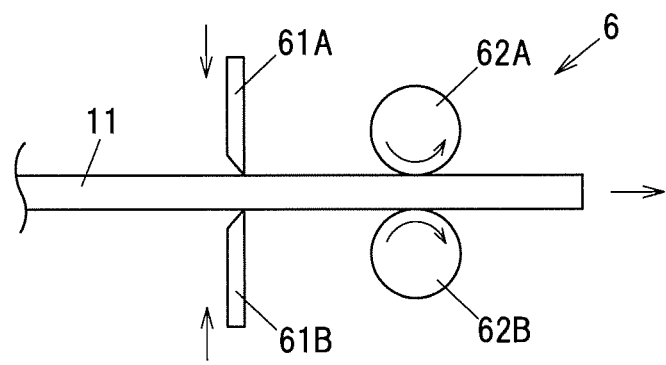
FIG. 4A is a schematic diagram illustrating a configuration of a wire cutting machine.
Figure 4B:
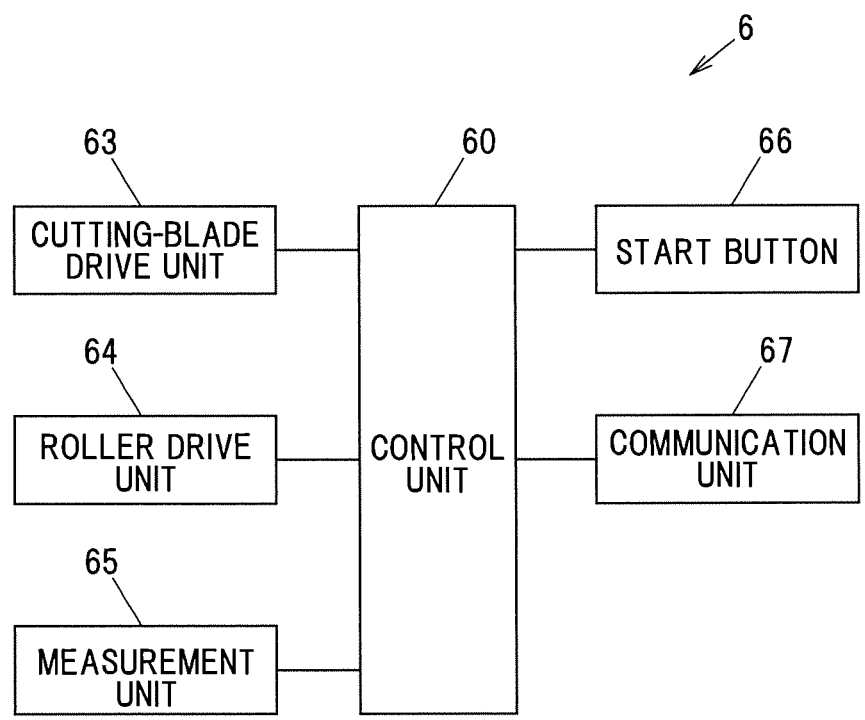
FIG. 4B is a block diagram illustrating a control system of the wire cutting machine.

FIG. 4A is a schematic diagram illustrating a configuration of the wire cutting machine 6 and FIG. 4B is a block diagram illustrating a control system of the wire cutting machine 6.

A shown in FIG. 4A, the wire cutting machine 6 is arranged at a cutting position and is provided with a pair of cutting blades 61A and 61B for cutting the electric wire 11, and a pair of rollers 62A and 62B for feeding the electric wire 11 toward the wire transfer robot 5.

As shown in FIG. 4B, the wire cutting machine 6 also has a control unit 60 which is provided with a cutting-blade drive unit 63 for driving the pair of cutting blades 61A and 61B, a roller drive unit 64 for driving the pair of rollers 62A and 62B, a measurement unit 65 such as encoder which measures the fed length of the electric wire 11 based on the rotation amount of the roller 62A, a start button 66 used by a user to manipulate the movement of the electric wire 11, and a communication unit 67 for signal transmission and reception between the system controller 9 and the wire transfer robot 5.

The control unit 60 receives information of a cutting length L1 of the electric wire 11 from the system controller 9 via the communication unit 67. When the start button 66 is pressed by a worker, the control unit 60 activates the roller drive unit 64, sends a travel start signal to the wire transfer robot 5 to initiate travel of the wire transfer robot 5, and directs the measurement unit 65 to measure a fed length L2 of the electric wire 11. When the sum of the measured length L2 and a length L3 from the cutting position to the gripping portion 51 of the wire transfer robot 5 reaches the cutting length L1 (=L2+L3), the control unit 60 deactivates the roller drive unit 64, sends a stop signal to the wire transfer robot 5 to stop the wire transfer robot 5 from travelling, and directs the cutting-blade drive unit 63 to cut the electric wire 11 at the cutting position.

Manufacturing Method

Next, an example of the method of manufacturing the wire harness will be described in reference to FIGS. 5A to 5D, 6, 7A and 7B. FIGS. 7A and 7B are flowcharts showing an example of wire harness manufacturing process. The wire harness manufacturing process includes, e.g., a wire cutting step, a wire laying step, a wire end-processing step, and a step of bundling the electric wires which are laid.

(1) Display of Wire Laying Image

Figure 5A:
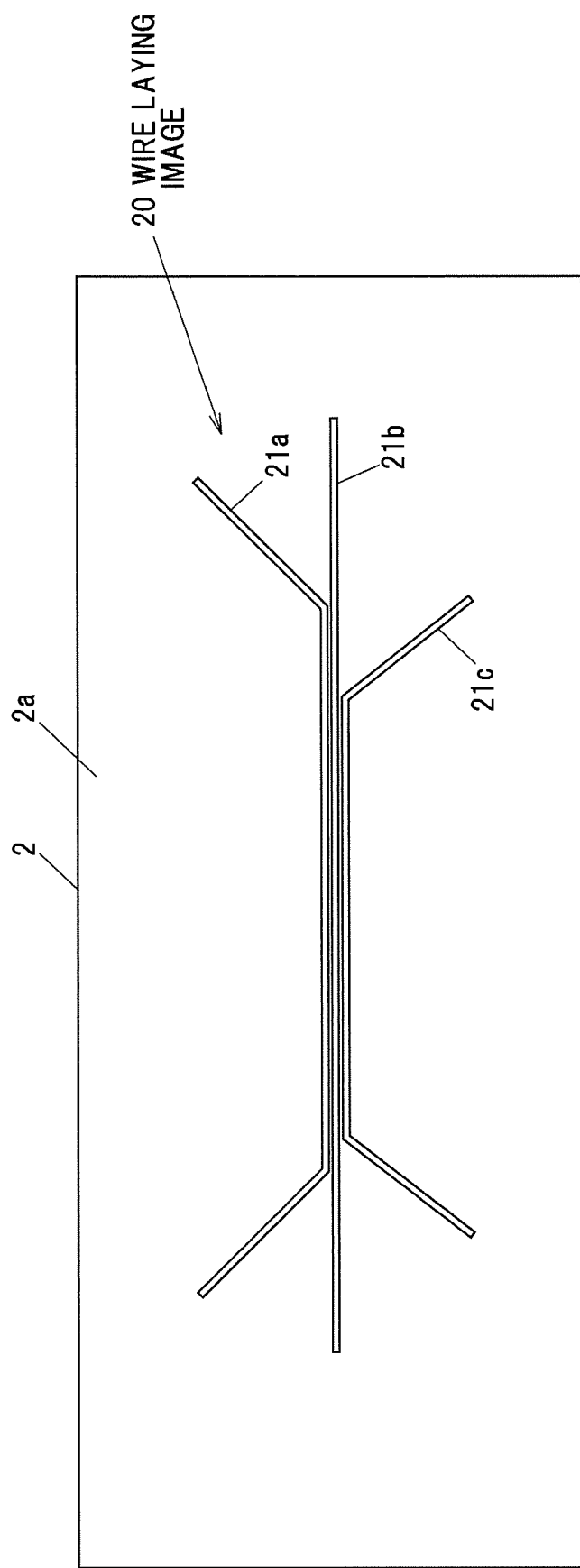
FIG. 5A is a diagram illustrating a display example of a display unit.

A supervisor operates the input unit 91 of the control unit 90 and inputs a wire harness ID. The control unit 90 retrieves, from the memory unit 93, the wire laying image data 931 corresponding to the wire harness ID input through the input unit 91, and displays a wire laying image 20 on the display unit 2 as shown in FIG. 5A (S1). The wire laying image 20 shown in FIG. 5A includes the wire images 21a to 21c showing the plural (e.g., three) electric wires 11 in the laid state. The worker Pa is positioned on the left side of the display unit 2 (on the side A) and the worker Pb is positioned on the right side of the display unit 2 (on the side B).

(2) Work Regarding the First Electric Wire 11

Figure 5B:
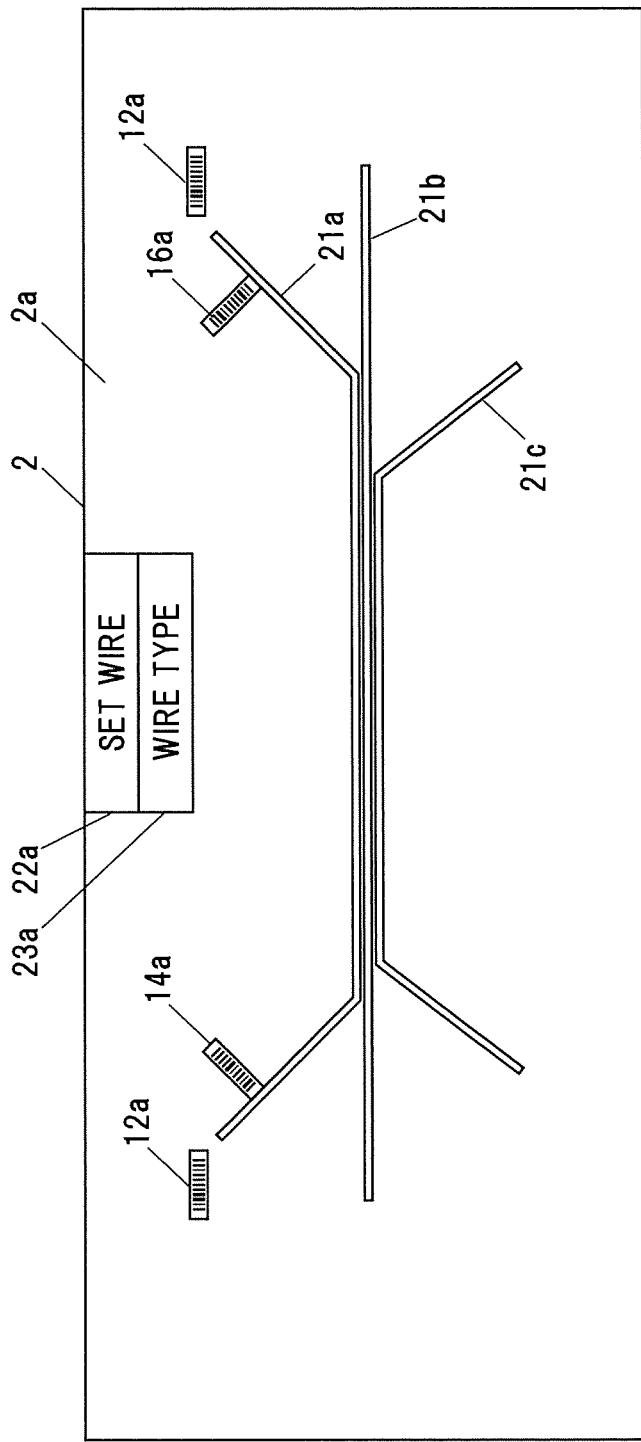
FIG. 5B is a diagram illustrating a display example of the display unit.

Next, based on the work instruction information 932 and the display position information 933, the control unit 90 displays the pop-up barcodes 12a on the sides of both ends (on the side A and the side B) of the wire image 21a showing the first electric wires 11, as shown in FIG. 5B (S2).

The worker Pa positioned on the left side uses the barcode reader 8A and scans the pop-up barcode 12a displayed on the side A of the display unit 2. The barcode reader 8A sends the scanned pop-up barcode 12a, together with its reader ID, to the system controller 9. The control unit 90 of the system controller 9, which received the pop-up barcode 12a and the reader ID (S3: Yes), records and adds the received pop-up barcode 12a and reader ID as work history of the first electric wire 11 to the work history information 934.

Based on the work instruction information 932, the control unit 90 determines whether or not this electric wire 11 is supposed to be firstly processed (S4). Since this electric wire 11 in this case is the first electric wire (S4: Yes), the control unit 90 retrieves the massage 22a indicating "set wire" and the wire type 23a from the work instruction information 932 and displays the massage 22a "set wire" and the wire type 23a on the top center of the display unit 2 (S5), as shown in FIG. 5B.

Next, the worker Pa positioned on the left side of the display unit 2 sets the wire feed reel 41A corresponding to the wire type 23a, in accordance with the massage 22a "set wire" displayed on the display unit 2. The wire feed reel 41A has the label 410 on which the wire type 23a and the wire type barcode 43a are printed. The wire feed reel 41B has the label 410 on which the wire type 23b and the wire type barcode 43b are printed. The worker Pa sets the wire feed reel 41A, which corresponds to the wire type 23a displayed on the display unit 2, on the support member 42.

Next, the worker Pa uses the barcode reader 8A and scans the wire type barcode 43a printed on the label 410 of the wire feed reel 41A. The barcode reader 8A sends the scanned wire type barcode 43a, together with its reader ID, to the system controller 9.

The control unit 90 of the system controller 9, which received the wire type barcode 43a and the reader ID (S6: Yes), records and adds the received wire type barcode 43a as the work history of the first electric wire 11 to the work history information 934. At this stage, the control unit 90 determines whether or not the wire type barcode 43a sent from the barcode reader 8A matches the wire type barcode 43a registered on the first row of the work instruction information 932. Then, the control unit 90 sends the cut length information to the wire cutting machine 6 when matching up, and displays an error message on the display unit 2 when not matching up.

The control unit 90 sends information of the cutting length L1 to the wire cutting machine 6 (S7). The control unit 60 of the wire cutting machine 6 receives the information of the cutting length L1 sent from the system controller 9 via the communication unit 67 and stores the information in a memory.

The worker Pa positions the electric wire 11 so that the gripping portion 51 of the wire transfer robot 5 grips a tip end of the electric wire 11 through the wire cutting machine 6. After setting the electric wire 11, the worker Pa presses the start button 66 of the wire cutting machine 6. When the start button 66 is pressed, the control unit 60 of the wire cutting machine 6 sends a travel start signal to the wire transfer robot 5 via the communication unit 67. Based on the travel start signal, the wire transfer robot 5 starts to travel toward the side B along the carriage rail 50. Once the wire transfer robot 5 starts traveling, the measurement unit 65 of the wire cutting machine 6 measures the fed length L2 of the electric wire 11. When the sum of the fed length L2 of the electric wire 11 and the length L3 from the cutting position to the gripping position of the wire transfer robot 5 reaches the cutting length L1 stored in the memory, the control unit 60 sends a travel stop signal to the wire transfer robot 5 and the system controller 9. Based on the sent travel stop signal, the wire transfer robot 5 stops travelling. Then, the control unit 60 directs the cutting-blade drive unit 63 to cut the electric wire 11.

The control unit 90 of the system controller 9, which received the travel stop signal sent from the wire cutting machine 6, retrieves the A-end code 13a and the A-end barcode 14a of the first electric wire 11 from the work instruction information 932 and then sends the A-end code 13a and the A-end barcode 14a as print information to the printer 7A provided on the side A, and also retrieves the B-end code 15a and the B-end barcode 16a from the work instruction information 932 and then sends the B-end code 15a and the B-end barcode 16a as print information to the printer 7B provided on the side B (S8).

The printer 7A, which received the A-end code 13a and the A-end barcode 14a from the control unit 90, prints the A-end code 13a on a marker tube 110 and then cuts the marker tube 110 to a predetermined length, and also prints the A-end barcode 14a on a marker tape 111 and then cuts the marker tape 111 to a predetermined length.

The printer 7B, which received the B-end code 15a and the B-end barcode 16a from the control unit 90, prints the B-end code 15a on a marker tube 110 and then cuts the marker tube 110 to a predetermined length, and also prints the B-end barcode 16a on a marker tape 111 and then cuts the marker tape 111 to a predetermined length.

Figure 6:
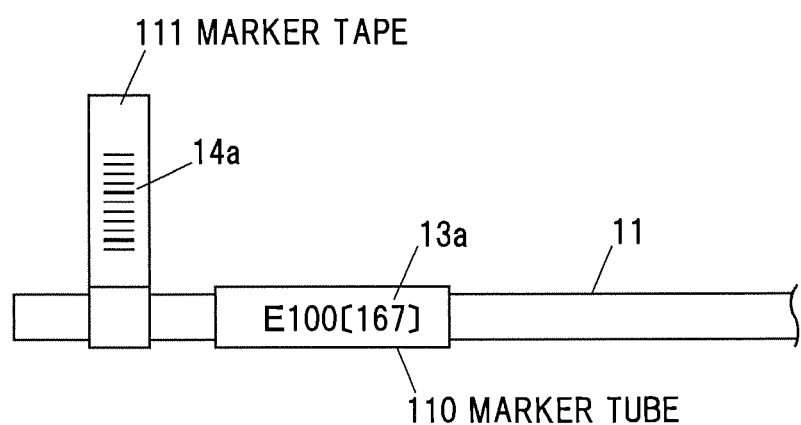
FIG. 6 is a diagram illustrating an electric wire to which a marker tape and a marker tube are attached.
Figure 7A:
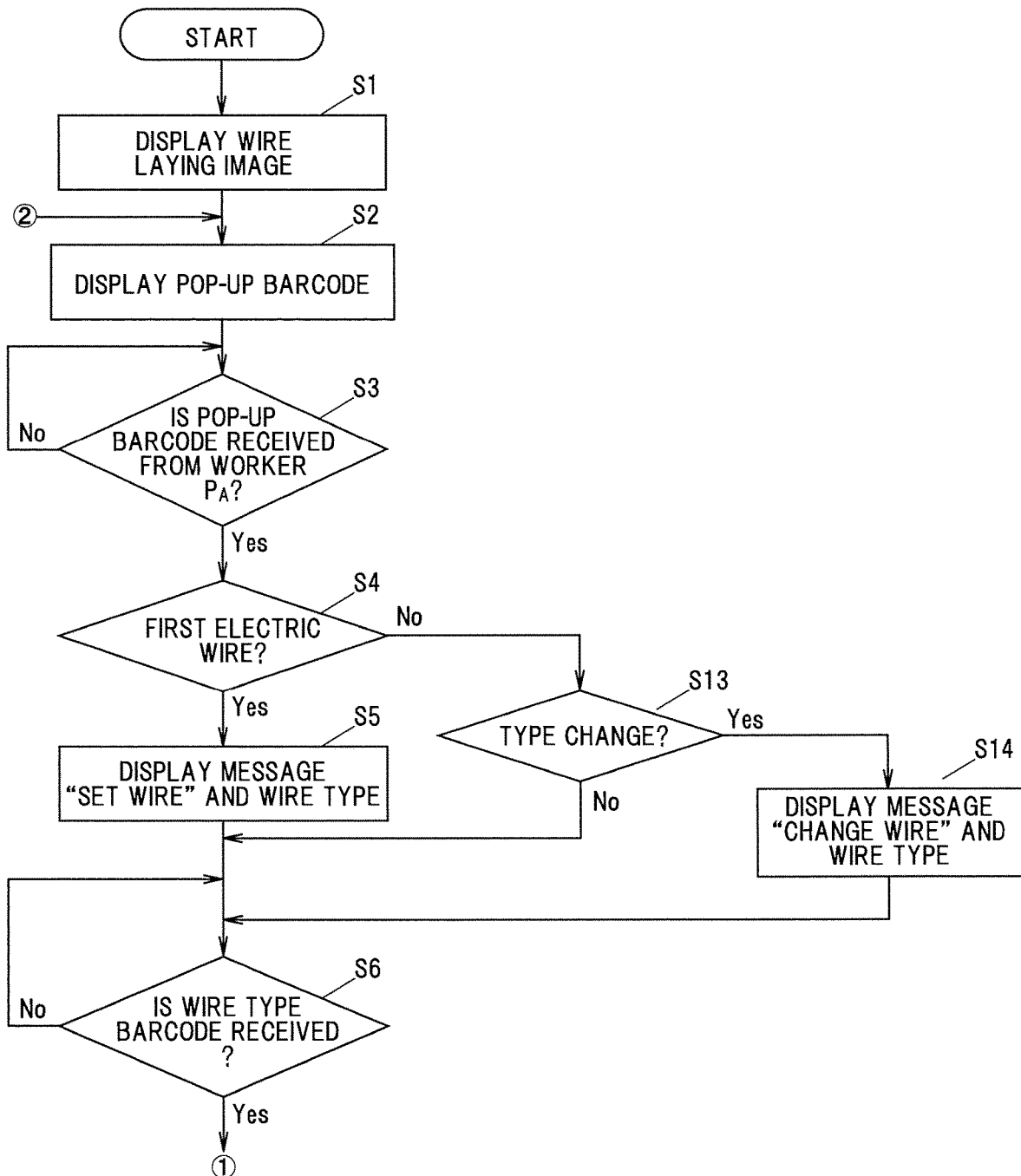
FIG. 7A is a flowchart showing an example operation of the system controller.
Figure 7B:
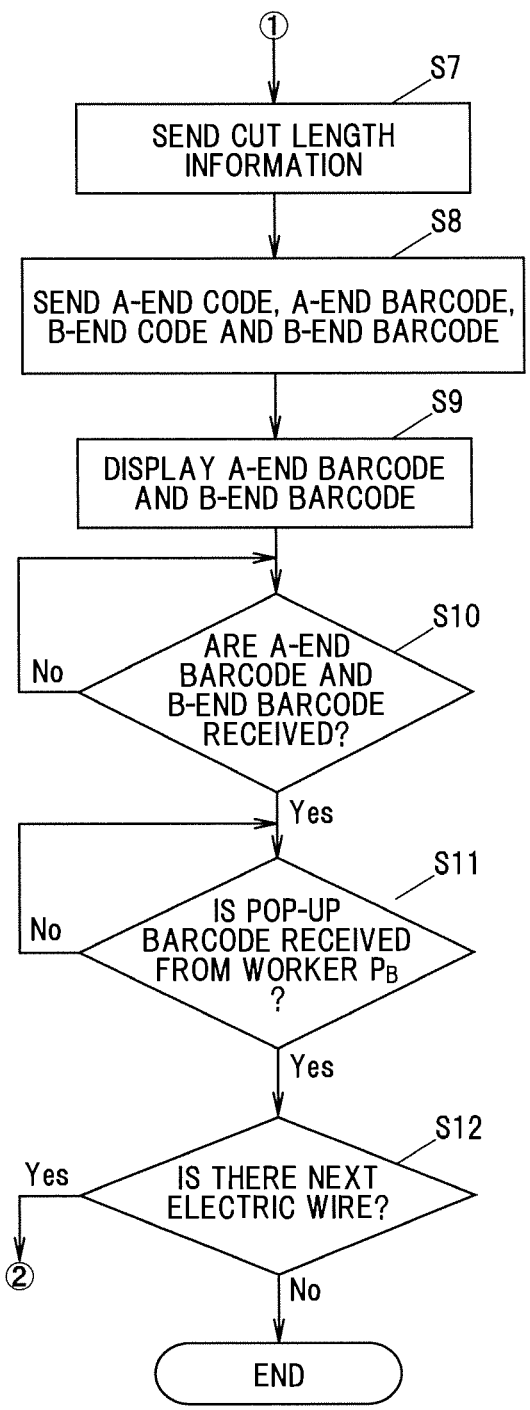
FIG. 7B is a flowchart showing the example operation of the system controller.

FIG. 6 is a diagram illustrating the electric wire 11 to which the marker tube 110 and the marker tape 111 are attached. The worker Pa attaches the marker tube 110 with the A-end code 13a printed thereon to the electric wire 11 by sliding from the left side and then sticks the marker tape 111 with the A-end barcode 14a printed thereon to the left end of the electric wire 11, as shown in FIG. 6. The marker tape 111 prevents the marker tube 110 from skipping off from the electric wire 11. The Worker Pb also attaches the marker tube 110 and the marker tape 111 to the right end of the electric wire 11 in the same manner as the worker Pa does.

The control unit 90 directs the display unit 2 to display the A-end barcode 14a and the B-end barcode 16a on, e.g., the inner side of the display positions of the pop-up barcodes 12a (S9).

The workers Pa and Pb remove the cut electric wire 11 of the predetermined length from the wire transfer robot 5 and the wire cutting machine 6, and lay the electric wire 11 overlapping onto the wire image 21a displayed on the display unit 2.

When the A-end code 13a printed on the marker tube 110 represents a type of connector as the end processing, the worker Pa prepares a connector corresponding to the A-end code 13a.

The worker Pa uses the barcode reader 8A and scans the A-end barcode 14a displayed on the display unit 2 and a connector barcode on the prepared connector. The barcode reader 8A sends the scanned A-end barcode 14a and connector barcode, together with its reader ID, to the system controller 9.

The control unit 90 determines whether or not the A-end barcode 14a and the connector barcode sent from the barcode reader 8A match, and when matching up, the control unit 90 records and adds the A-end barcode 14a, together with information that the work was done properly, to the work history information 934.

After finishing the work regarding the first electric wire 11, the worker Pb on the right side uses the barcode reader 8B and scans the pop-up barcode 12a displayed on the side B of the display unit 2. The barcode reader 8B sends the scanned pop-up barcode 12a, together with its reader ID, to the system controller 9.

The control unit 90 of the system controller 9 records and adds the sent pop-up barcode 12a and reader ID, as an indication of completion of the work regarding the first electric wire 11, to the work history information 934.

(3) Work Regarding the Second Electric Wires 11

Figure 5C:
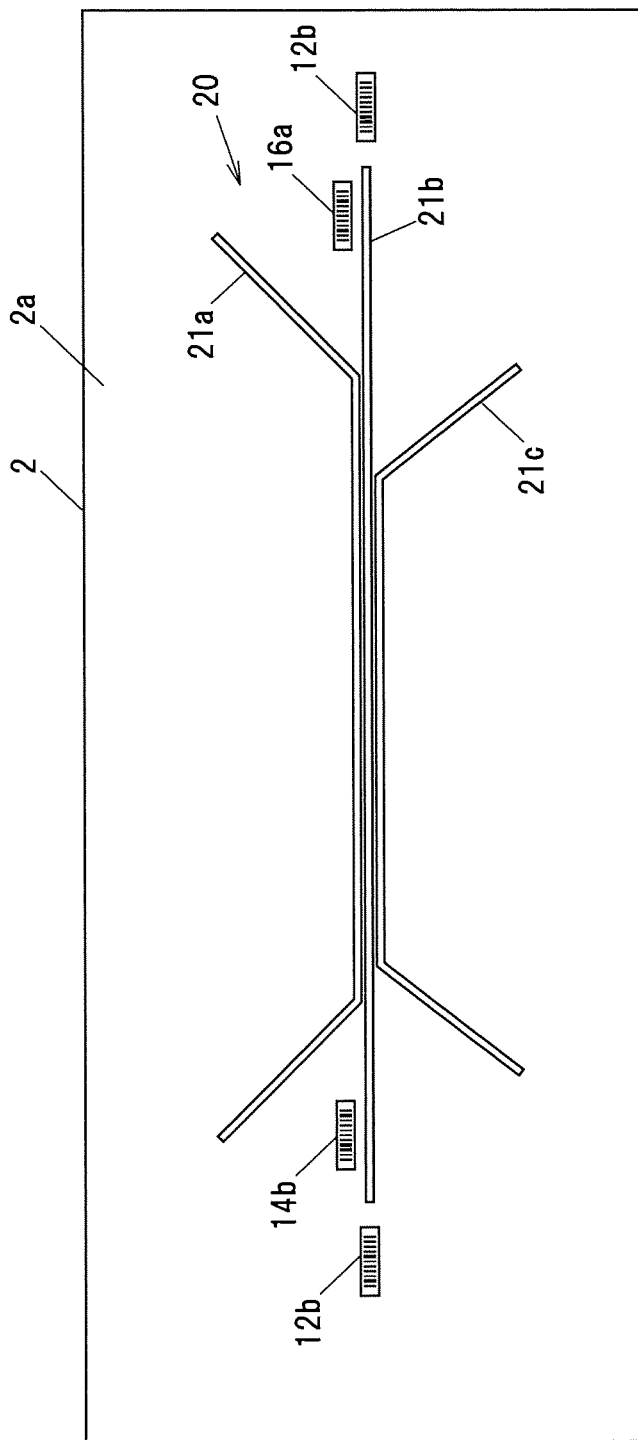
FIG. 5C is a diagram illustrating a display example of the display unit.

The control unit 90 of the system controller 9 reads the work instruction information 932 to retrieve the pop-up barcode 12b corresponding to the second electric wire 11 and displays the pop-up barcodes 12b on the display unit 2 (S2) as shown in FIG. 5C. The control unit 90, which received the pop-up barcode 12b from the barcode reader 8A of the worker Pa (S3), determines, based on the work instruction information 932, whether or not it is the first electric wire 11 (S4). Since it is not the first electric wire 11 (S4: No) in this case, the control unit 90 refers the work instruction information 932 and determines whether or not the type of the electric wire 11 is changed (S13).

Since the type of the electric wire 11 is not changed (S13: No), the control unit 90 sends the A-end code 13b, the A-end barcode 14b, the B-end code 15b and the B-end barcode 16b (S8) and displays the A-end barcode 14b and the B-end barcode 16b on the display unit 2 (S9) in the same manner as the first electric wire. When the control unit 90 receives the A-end barcode 14b and the B-end barcode 16b (S10: Yes) and the reader ID and the pop-up barcode 12b from the worker Pb (S11: Yes), the control unit 90 determines whether or not there is a next electric wire 11 to be processed (S12). Since there is the next electric wire 11 (S12: Yes) in this case, the process proceeds to S2.

(4) Work Regarding the Third Electric Wire

The control unit 90 of the system controller 9 reads the work instruction information 932 to retrieve the pop-up barcode 12c corresponding to the third electric wire 11 and displays the pop-up barcodes 12c on the display unit 2 (S2) as shown in FIG. 5D. The control unit 90, which received the pop-up barcode 12c and the reader ID from the barcode reader 8A of the worker Pa (S3), determines, based on the work instruction information 932, whether or not it is the first electric wire 11 (S4). Since it is not the first electric wire 11 (S4: No) in this case, the control unit 90 refers the work instruction information 932 and determines whether or not the type of the electric wire 11 is changed (S13). Since the type of the electric wire 11 is changed (S13: Yes), the control unit 90 directs the display unit 2 to display the massage 22b indicating "change wire" and the wire type 23b after the change (S14).

The worker Pa on the left side sets the wire feed reel 41B corresponding to the wire type 23b on the support member 42, in accordance with the massage 22b "change wire" displayed on the display unit 2.

Next, the worker Pa uses the barcode reader 8A and scans the wire type barcode 43b printed on the label 410 of the wire feed reel 41B. The barcode reader 8A sends the scanned wire type barcode 43b, together with its reader ID, to the system controller 9. After that, the process is carried out in the same manner as the first electric wire 11.

Functions and Effects of the Embodiment

The following functions and effects are obtained in the embodiment.

(a) Since the wire cutting machine 6 cuts the electric wire using the wire transfer robot 5 under control of the system controller 9 at the time of laying the electric wire, it is not necessary to pre-cut the electric wire. Therefore, a space for storing cut wires is not required.

(b) Since the work can be shared between two workers, work can be proceeded promptly even for a long wire harness of more than 15 m in full length.

(c) Only by scanning the barcodes of wire work identification information, wire identification information and wire-end information, etc., using the barcode readers of the two workers, it is possible to record such information as work history.

OTHER MODIFICATIONS

The invention is not intended to be limited to the embodiment, and the various kinds of modifications can be implemented without departing from the gist of the invention. For example, although barcodes are used as information representing the electric wire, the type of electric wire and end-processing, etc., in the embodiment, machine-readable optical codes such as two-dimensional barcode, e.g., QR code (trademark), etc., may be used.

In addition, the wire transfer robot 5 travels under control of the wire cutting machine 6 in the embodiment but may travel under control of the system controller 9.

In addition, some of the constituent elements in the embodiment of the invention may be omitted without departing from the gist of the invention. In addition, various additions, omissions, changes and substitutions, etc., can be made to the assembling process of the embodiment without departing from the gist of the invention.

The invention is applicable to railway wire harnesses, aircraft wire harnesses, vehicle wire harnesses, medical wire harnesses and device wire harnesses, etc.

What is claimed is:

1. A wire harness manufacturing system, comprising:
   a display unit displaying a wire laying image showing plural electric wires constituting the wire harness in the laid state;
   a wire transfer robot travelling along one long side of the display unit to convey an electric wire, and
   a wire cutting machine for cutting the electric wire conveyed by the wire transfer robot at a cutting position,
   wherein the display unit includes a screen on which a worker can carry out tasks, and
   wherein the one long side of the display unit is a travelling area of the wire transfer robot, wherein another long side of the display unit is a working area of the worker.

2. The wire harness manufacturing system, according to claim 1, wherein the display unit comprises a rectangular shape.

3. The wire harness manufacturing system, according to claim 1, wherein the display unit comprises plural displays arranged along a longitudinal direction of a wire harness to be manufactured.

4. The wire harness manufacturing system, according to claim 1, wherein an entire length of the wire harness is displayed by plural displays of the display unit.

5. The wire harness manufacturing system, according to claim 1, wherein the wire laying image to be displayed on the display unit includes divided images to be displayed on respective displays.

6. The wire harness manufacturing system, according to claim 1, wherein the display unit is supported such that the screen is substantially level on which the worker can carry out tasks.

7. A wire harness manufacturing system, comprising:
   a rectangular display unit comprising plural displays arranged along a longitudinal direction of a wire harness to be manufactured and displaying a wire laying image showing plural electric wires constituting the wire harness in the laid state, an entire length of the wire harness being displayed by plural displays of the display unit, the wire laying image to be displayed on the display unit including divided images to be displayed on respective displays;
   a wire transfer robot travelling along one long side of the display unit to convey an electric wire, and
   a wire cutting machine for cutting the electric wire conveyed by the wire transfer robot at a cutting position,
   wherein the display unit includes a screen that is substantially level on which a worker can carry out tasks, and wherein the one long side of the display unit is a travelling area of the wire transfer robot, wherein another long side of the display unit is a working area of the worker.

8. The wire harness manufacturing system according to claim 7, wherein the travelling area of the wire transfer robot is above the screen of the display unit.

9. The wire harness manufacturing system according to claim 8,
wherein the wire cutting machine includes a measurement unit which measures a fed length of the electric wire, and
wherein when the sum of a measured length $L2$ of the electric wire measured by the measurement unit and a length $L3$ of the electric wire from the cutting position to a gripping portion of the wire transfer robot reaches a cutting length $L1$, wherein $L1$, the wire transfer robot is stopped from travelling, and the wire cutting machine cuts the electric wire at the cutting position.

* * * * *